United States Patent [19]

Cope et al.

[11] Patent Number: 5,020,426
[45] Date of Patent: Jun. 4, 1991

[54] FOOD PRODUCT COOKER

[75] Inventors: Jonathan C. Cope; Michael F. Grady; Willard W. Pitman, all of Madera, Calif.

[73] Assignee: Valley Grain Products, Inc., Madera, Calif.

[21] Appl. No.: 371,125

[22] Filed: Jun. 26, 1989

[51] Int. Cl.⁵ .................................. A47J 37/12
[52] U.S. Cl. ........................... 99/353; 99/404; 99/407; 99/427
[58] Field of Search ............... 99/353, 404, 407, 427, 99/443 C, 416, 428; 198/803.9

[56] References Cited

U.S. PATENT DOCUMENTS

| | | | |
|---|---|---|---|
| 1,343,184 | 6/1920 | Baker et al. | 198/704 X |
| 2,352,447 | 6/1944 | Powers et al. | 99/427 X |
| 2,595,684 | 5/1952 | Lyons | 99/433 |
| 2,780,163 | 2/1957 | Lee | 99/380 X |
| 2,804,027 | 8/1957 | Hect | 198/704 X |
| 3,267,836 | 8/1966 | Yepis | 99/404 |
| 3,537,389 | 11/1970 | Villarreal | 99/427 |
| 3,570,393 | 3/1971 | Schy | 99/427 X |
| 3,602,130 | 8/1971 | Perez | 99/427 X |
| 3,667,372 | 6/1972 | Hilvitz et al. | 99/404 |
| 3,680,474 | 8/1972 | Brown | 99/427 X |
| 3,722,400 | 3/1973 | Jimenez | 99/427 X |
| 3,759,165 | 9/1973 | Wallace | 99/416 X |
| 3,763,764 | 10/1973 | Schy | 99/404 X |
| 3,766,846 | 10/1973 | Jimenez | 99/404 X |
| 3,817,163 | 6/1974 | Kizziar et al. | 99/353 |
| 3,861,289 | 1/1975 | Baker et al. | 99/404 |
| 3,901,137 | 8/1975 | Jimenez | 99/427 X |
| 3,946,655 | 3/1976 | Schy | 99/427 X |
| 3,948,160 | 4/1976 | Stickle | 99/427 X |
| 4,154,153 | 5/1979 | Stickle | 99/404 |
| 4,171,739 | 10/1979 | Yamato | 99/443 C X |
| 4,184,418 | 1/1980 | Jimenez | 99/407 X |
| 4,214,517 | 7/1980 | Caldwell | 99/428 |
| 4,380,191 | 4/1983 | Gallegos et al. | 99/407 X |
| 4,494,453 | 1/1985 | Bentson | 99/353 |
| 4,510,165 | 4/1985 | Caridis et al. | 99/407 X |
| 4,530,275 | 7/1985 | Stickle et al. | 99/404 X |
| 4,554,865 | 11/1985 | Caridis et al. | 99/407 X |
| 4,719,849 | 1/1988 | Cope et al. | 99/407 X |
| 4,754,699 | 7/1988 | Cope et al. | 99/404 |

*Primary Examiner*—Philip R. Coe
*Assistant Examiner*—Stephen F. Gerrity
*Attorney, Agent, or Firm*—Harris, Kern, Wallen & Tinsley

[57] ABSTRACT

A food product cooker having a main frame with a loading path and a discharge path, a cooking oil pan, a plurality of product carriages, and a main drive endless chain for moving the carriages about the main frame to and from the pan, with each of the carriages including a food product holder for holding a food product and a support arm having first and second ends with the drive chain attached at the first end and with a holder attached at the second end. Also a load support member and a loading conveyor downstream of the load support member, a first lifting rail for lifting a food holder away from the loading conveyor, a first pressure rail for moving the food holder toward the loading conveyor, a holder body stripper in the discharge path, and a discharge track for guiding cooked food products away from the discharge path.

19 Claims, 10 Drawing Sheets

FOOD PRODUCT COOKER

BACKGROUND OF THE INVENTION

This invention relates to food product cookers, and in particular to an apparatus especially adapted for cooking shells for tacos from tortillas.

A variety of food product cookers have been utilized in the past for producing taco shells and other tortilla type products. A continuing aim for machines of this type has been to make the equipment more automatic thereby reducing the amount of manual attention required, to make the machine more reliable and less prone to damage the product thereby reducing loss due to waste, and to increase the production rate thereby reducing costs.

One type of machine proposed utilizes male and female molds for forming the finished product shape. Machines of this type are shown in U.S. Pat. Nos. 3,680,474; 3,766,846, 3,901,137, 4,510,165; and 4,530,275. Another type of machine utilizes moveable members such as wings or plates to form a taco shell. Such machines are shown in U.S. Pat. Nos. 3,667,372; 3,861,289 and 4,184,418. Higher production rates have been achieved by some machine designs with the spacing between the tortilla forming units being reduced at the oil pan where cooking takes place. Such machines are shown in U.S. Pat. Nos. 3,946,655; 3,948,160; 4,380,191; 4,719,849 and 4,754,699.

Machines of the last mentioned type usually are able to utilize shorter oil pans for a given production rate than the earlier mentioned machines. While machines of this type have been used in a number of production facilities, problems have been encountered with respect to product loading and unloading and with fully automatic operation and precise formation of the finished product.

Some specific problems of earlier equipment overcome by the machine of the present invention include: improved control of product spacing and orientation of the discharge end of the machine; placing the product deeper in the oil while frying by driving the product carrying mandrel into the oil at an angle; and improved oil drainage of the fried product with a raised and lengthened oil pan exit path.

SUMMARY OF THE INVENTION

It is an object of the present invention to provide a new and improved food product cooker which is especially adapted for high speed and automatic production of products such as taco shells, and in particular an elongated taco shell product.

It is a particular object of the invention to provide a cooker with automatic centering of the uncooked tortilla and of the product holder in the loading section, with complete and accurate formation of the product into the desired shape prior to entering the cooking oil. A particular object is to provide such a machine with multiple loading belts for moving the food product through the loading section.

It is another object of the invention to provide such a food product cooker with automatic and controlled unloading of the cooked product, with a stripping and timing mechanism for unloading with minimum risk of damage to the finished product. A particular object is to provide such a machine wherein the unloaded product is in a controlled orientation and ready for delivery to the cooling and packing operation. A specific object is to provide a new and improved product stripping apparatus with a reduced number of parts and a reduced number of moving parts while requiring minimum contact between the food product and the apparatus.

It is another object of the invention to provide a high speed continuously operating food product cooker with a minimum number of cam rails, and with a plurality of support plates for the moving product holders with a resultant reduction in jams and maintenance and improvement in reliability and smoothness of operation. A particular object is to provide such a configuration utilizing support plates for direct contact with food product holders for improved product loading accuracy and improved product quality.

It is another object of the invention to provide a new and improved mandrel for forming and retaining the product during loading and cooking. A particular object is to provide such a mandrel for forming a taco shell with pivoted plates for holding the formed shell on the mandrel body, and contoured shoes for forming the flat tortilla to the mandrel body as the mandrel moves forward along its axis.

These and other objects, advantages, features and results will more fully appear in the course of the following description.

DESCRIPTION OF THE PREFERRED EMBODIMENT

Figures 1, 2:
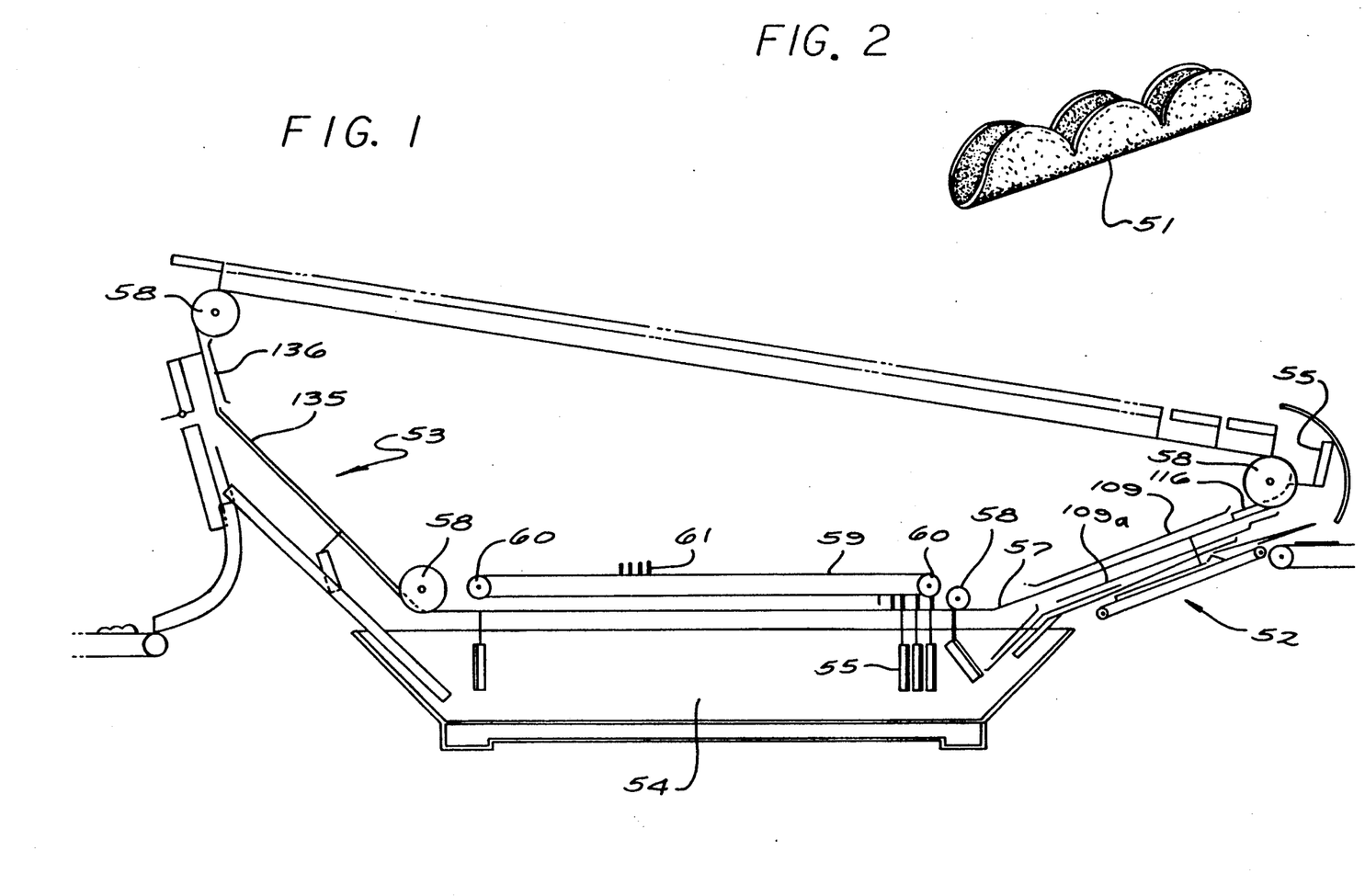
FIG. 1 is a diagramatic side view of a food product cooker incorporating the presently preferred embodiment of the invention.
FIG. 2 is an isometric view of a triple taco shell produced on the machine of FIG. 1.

A food product cooker incorporating the preferred embodiment of the present invention is shown diagramatically in FIG. 1, and a typical product, in this instance a triple taco shell 51, is shown in FIG. 2. The cooker has a load end 52 and a discharge end 53, with a heated oil pan 54 positioned therebetween. A plurality of product carrying mandrels 55 are supported in carriages 56 which in turn are attached to main drive chains 57 which move around sprockets 58. Carriage pusher chains 59 are positioned above the oil pan 54 and move around sprockets 60. Typically, two of the mandrels are mounted side by side in a carriage, and the carriages are positioned between two of the main drive chains 57 and are moved through the oil pan by pusher members 61 positioned between two carriages pusher chains 59. The basic drive arrangement for the main drive chains and the carriage pusher chains may be as shown in the aforesaid U.S. Pat. Nos. 4,719,849 and 4,754,699. Sometimes there is a tendency for the drive chain to jam when it goes limp at the mandrel transition from the drive chain to the pusher chain. This can be overcome by positioning a chain deflector at this location to move the drive chain along.

The load end at 52 is shown in greater detail in FIGS. 3–5 and 22–25, and the mandrels and carriages are shown in greater detail in FIGS. 6–7 and 14–17.

Figure 3:
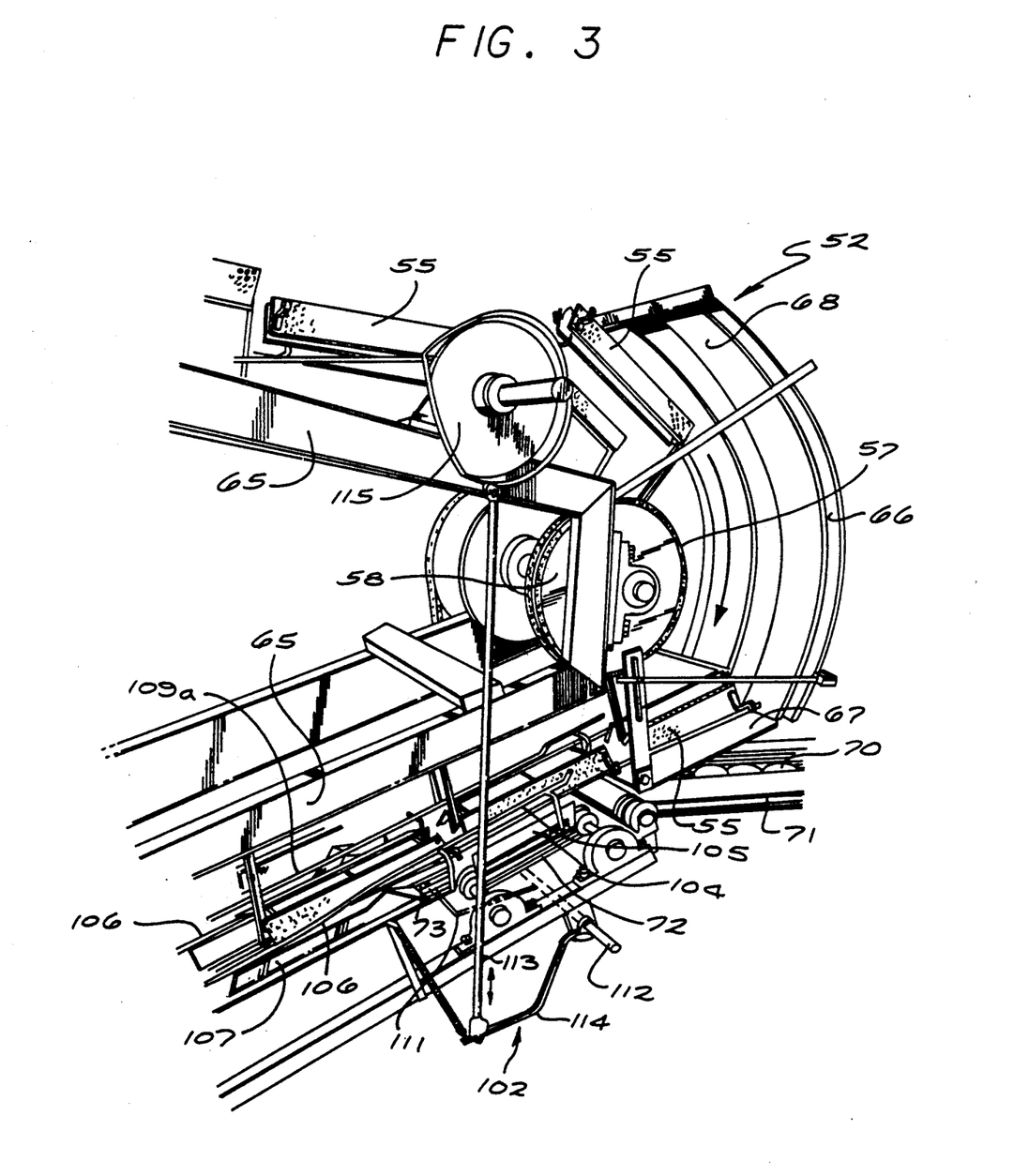
FIG. 3 is an enlarged perspective view of the load end of the machine of FIG. 1.

First considering the load end 52, the sprockets 58 are shown in FIG. 3 mounted in bearings on a machine frame 65. A radius turn support plate 66 and a loading station support plate 67 are also mounted on the frame. Wear strips 68 of Teflon or similar material may be mounted on the support plates if desired. Mandrel centering guides 69 are positioned on the upper surface of the loading station support plate 67 for accurately positioning an incoming mandrel. There is a gap between the support plate 66 and the support plate 67, best seen in FIG. 4, which permits oil and food product chips from the incoming mandrels to drop downward from the end of the support plate 66 prior to the mandrel arriving at the support plate 67.

The product 70 which is to be cooked is delivered to the machine on a conveyor 71, sometimes referred to as an indexer conveyor, and is deposited onto a loading conveyor 72. The loading conveyor 72 is formed in two sections, preferably comprising a plurality of belts typically of circular cross section, running on motor driven pulleys. As illustrated, the loading conveyor includes a longer inner section 73 positioned between shorter outer sections 74. Typically the food product is a tortilla which has been die cut into a triple disk configuration, which when folded to a taco shell shape will have the configuration shown in FIG. 2.

Figure 6:
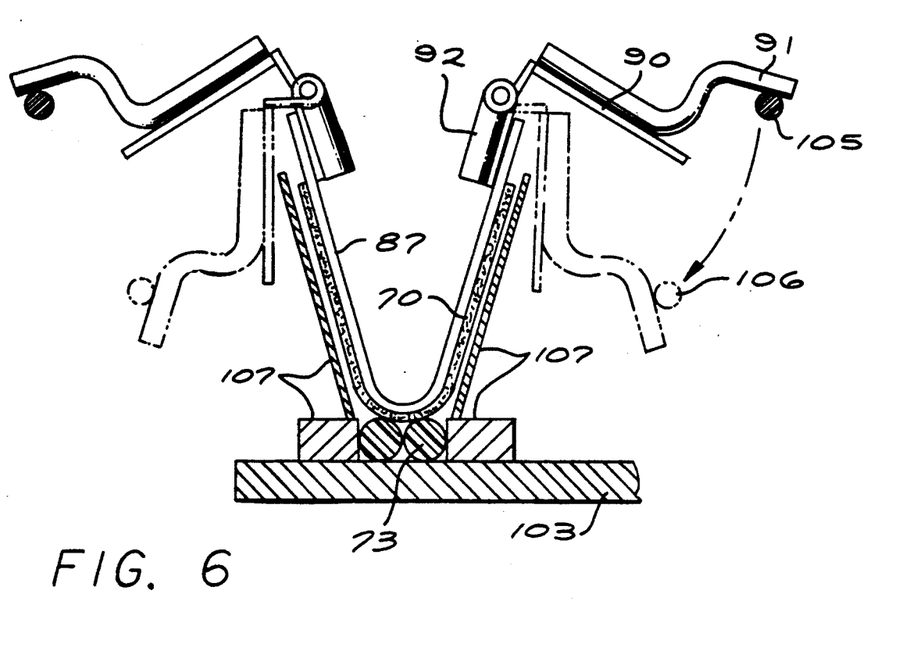
FIG. 6 is an enlarged partial sectional view taken along the line 6—6 of FIG. 4.
Figure 7:
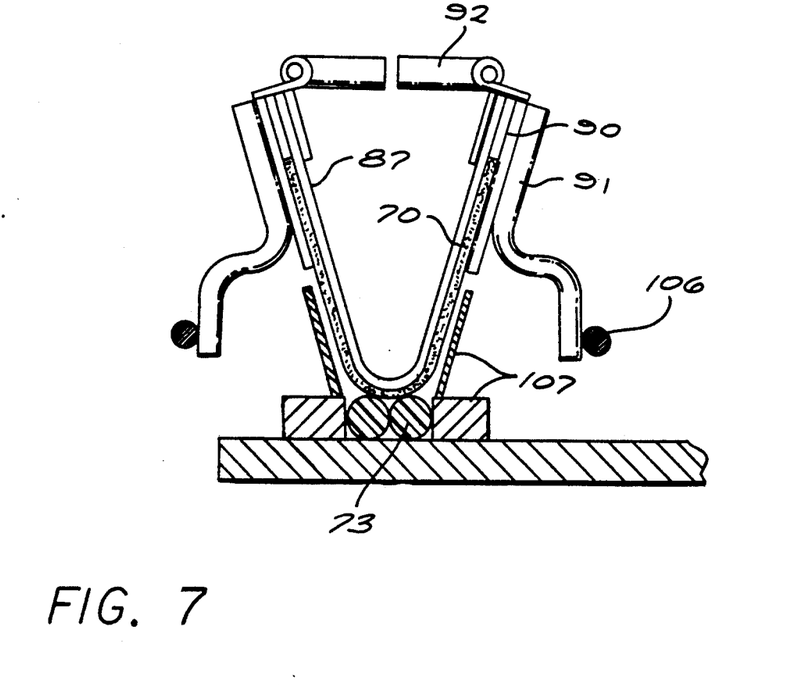
FIG. 7 is a view similar to that of FIG. 6 taken along the line 7—7 of FIG. 4.
Figure 14:
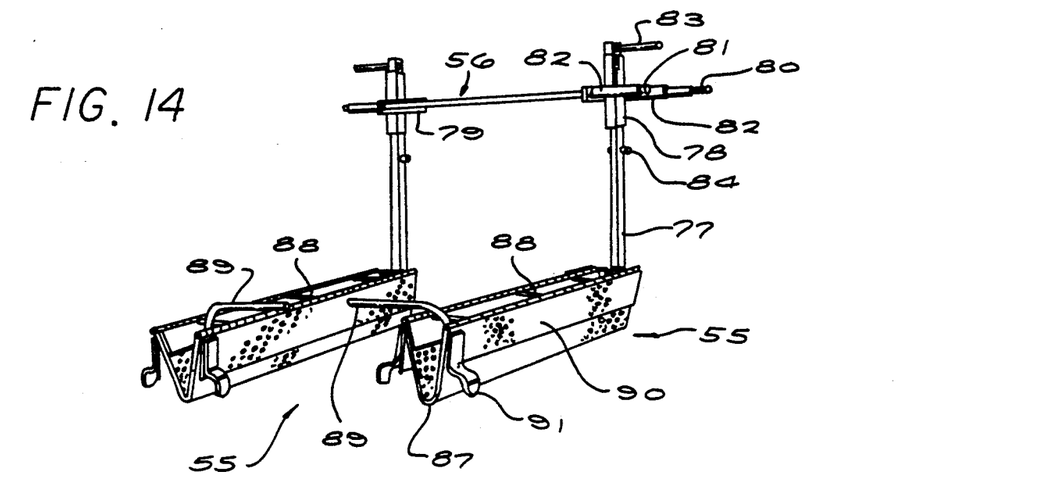
FIG. 14 is a perspective view of a carriage with two mandrels.
Figure 15:
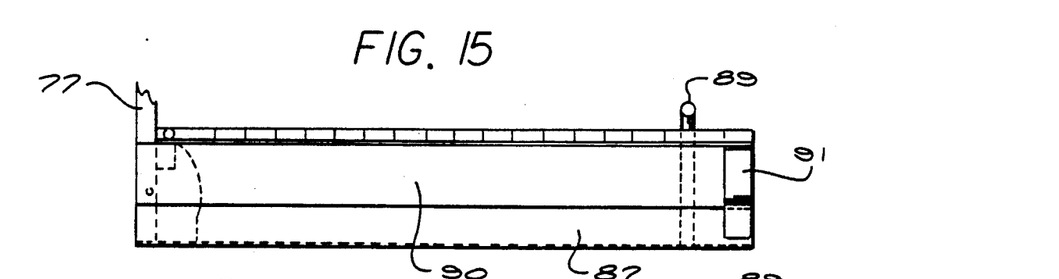
FIG. 15 is a side view showing a mandrel in a pivot up position.
Figure 16:
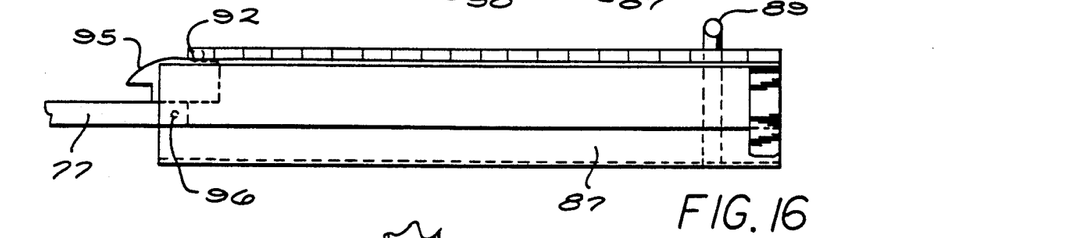
FIG. 16 is a view similar to that of FIG. 15 showing a mandrel in a pivot down position.
Figure 17:
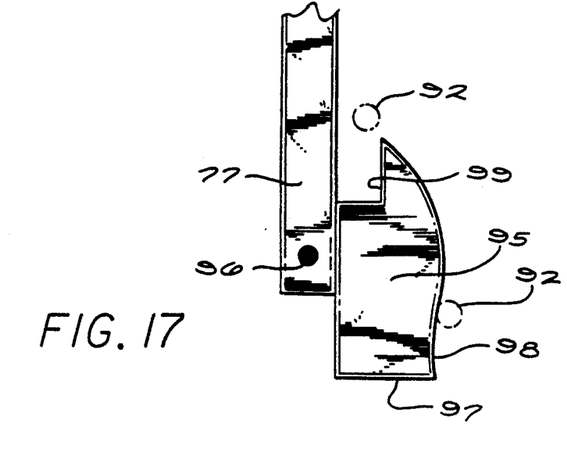
FIG. 17 is an enlarged view showing the detailed construction of the cam of FIGS. 15 and 16.

A carriage and mandrel assembly is shown in FIG. 14, with side views of a mandrel in FIGS. 15–16 and cross sectional views of a mandrel in FIGS. 6 and 7. Each mandrel has a carriage arm 77 which slides in a tube 78 of the carriage. A cross bar 79 is attached to each tube 78, and the cross bars are joined together by a transverse bar 79a. The cross bars are also connected by a long rod 80 and a short rod 81, with rollers 82 on the outer portions of the rods. Each carriage is attached to the main drive chains 57 at the ends of the long rod. An arm down stop 83 and an arm up stop 84 are carried on each carriage arm 77. Arm down stop 83 also serves as a camming arm to raise or lower the carriage arm and mandrel in the load and unload areas. The stop 83 transmits the downward force of the pressure rails in the loading area and unloading area to the mandrel for loading and stripping.

Each mandrel has a mandrel body 87 formed in a U or V shape of perforated metal, with cross braces 88 across the open end of the body, and a mandrel pivot arm 89 attached to the body. A pivot plate or wing 90 is hinged at each edge of the mandrel body 87, with the plates also made of perforated metal. An ear 91 and a stop arm 92 are attached to each of the pivot plates.

A lock down cam 95 is fixed at the mandrel end of each of the carriage arms 77, and the mandrel body 87 is pivotally mounted on the carriage arm by a pin 96. The cam 95 includes a pivot up hard stop surface 97, a pivot down hard stop surface 98, and a slot 99. The mandrel is shown in the pivot up position in FIG. 15 and in the pivot down position in FIG. 16.

The cam 95 functions to lock the arms 92 and the pivot plates 90 in position when the mandrel is in the pivot down position. The slot 99 allows the stop arms 92 to move when the mandrel is in the pivot up position. The stop arms move in the slot as the pivot plates are opened and closed. When the mandrel is in the full pivot up position the pivot plates are closed but can be opened, with the mandrel body engaging the pivot up hard stop surface of the cam. The mandrel is in the pivot up position at the load end, the discharge end, and when returning to the load end after striping. The pivot plates are not locked against the mandrel body as the stop arms can move up and down in the slot in the cam. The ears 91 are moved by caming rails (to be described) to open or close the pivot plates.

Figures 18, 19:
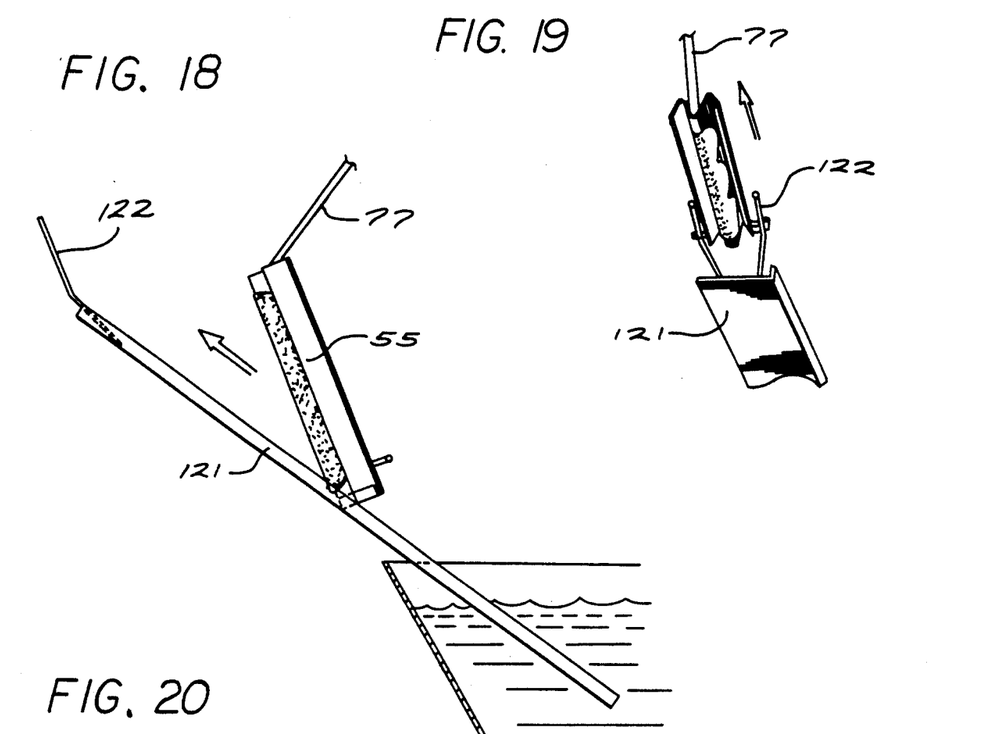
FIGS. 18–21 are partial views illustrating the construction and operation of the product stripper.
Figures 20, 21:
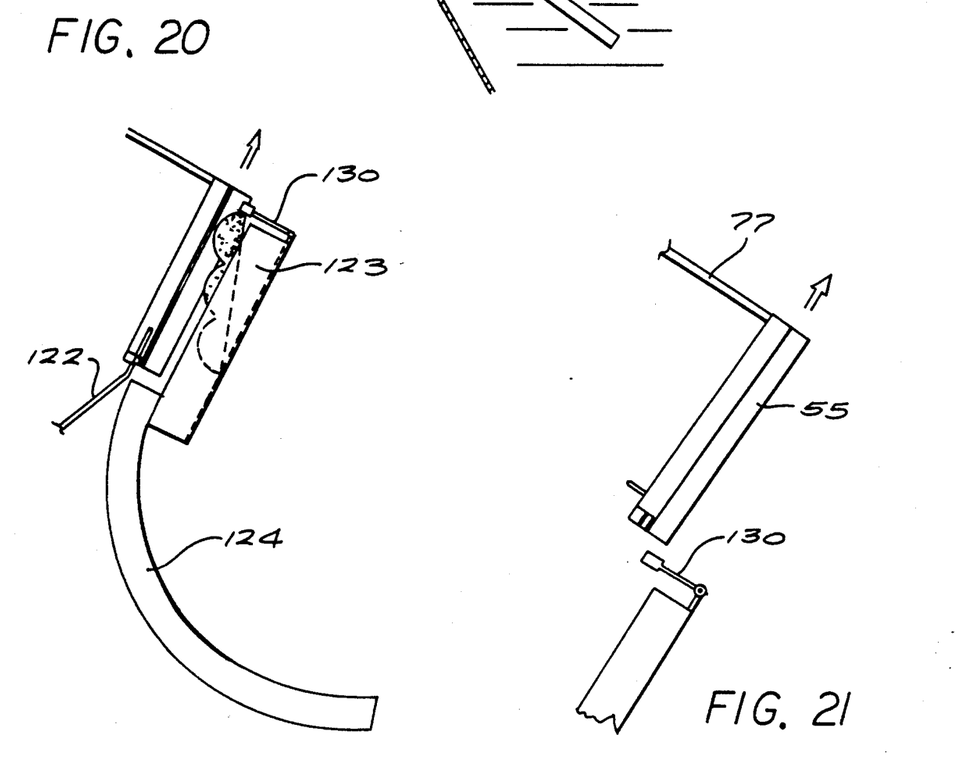
Figures 22, 23:
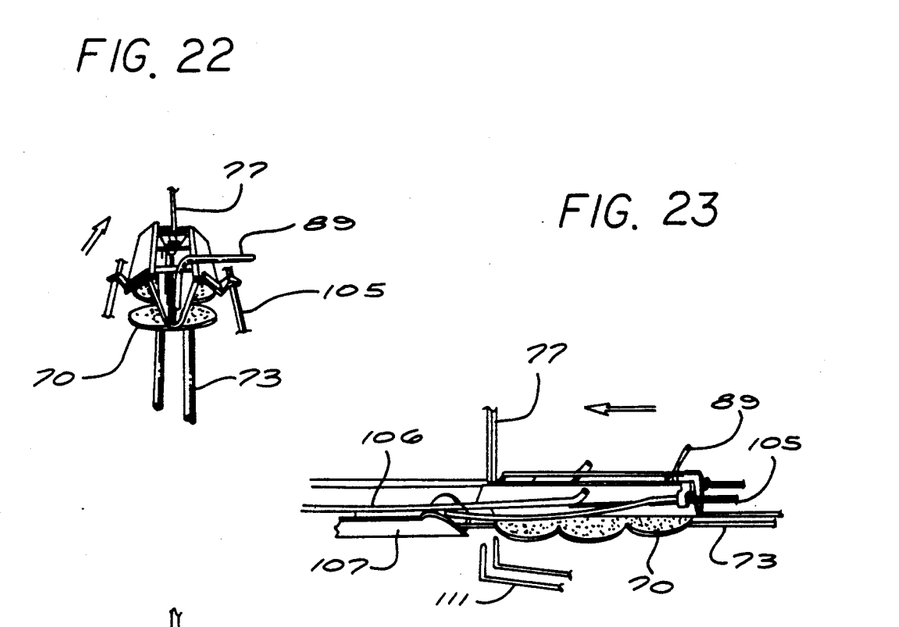
FIGS. 22–24 are similar views illustrating the product loading operation.
Figures 24, 25:
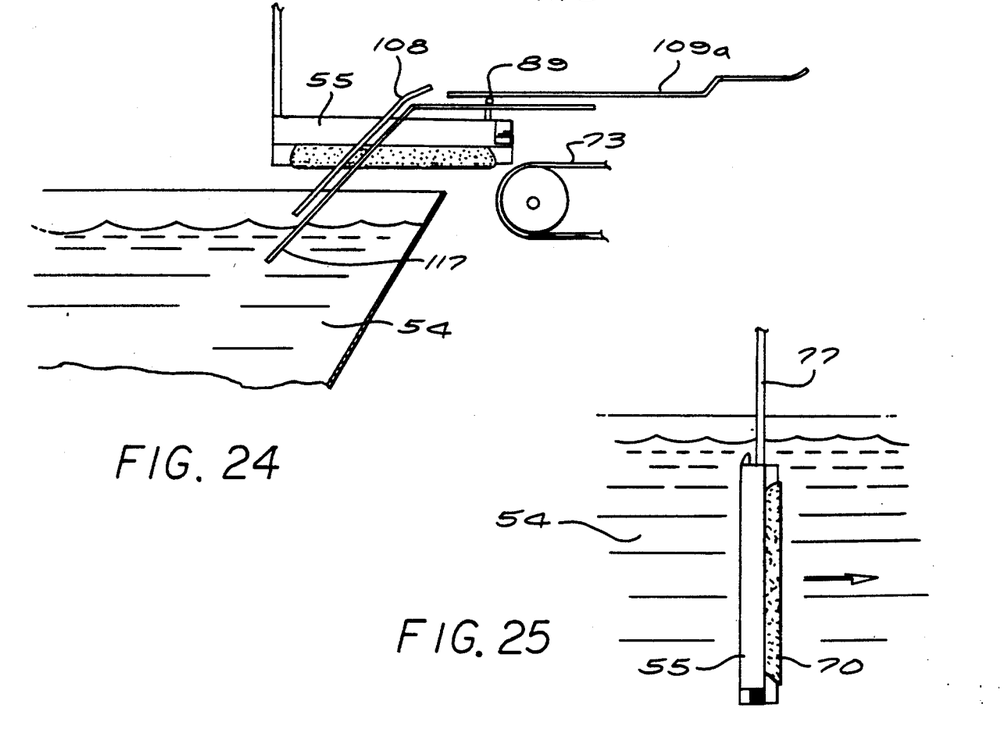
FIG. 25 is a partial side view illustrating a mandrel in the oil pan.

When in the pivot down position of FIG. 16, the pivot plates are closed and locked and the cam arms are riding against the cam engaging the pivot down hard stop surface 98. The pivot down position occurs when the mandrel is in the oil pan. The mandrel is also in a partial pivot up position with the pivot plates closed and locked and with the cam arms riding against the cam and not being movable. This position is shown in FIG. 18, when the mandrel exits the oil pan and approaches the product stripper (in a manner to be described).

The product 70 is transferred from the indexer conveyor 71 to a mandrel 55 at a loading station 102. A bed 103 (FIG. 6) is positioned under the entire length of the loading area supporting the loading conveyor 72 and the folding shoes 107. At the loading station adjustable guides 104 are mounted on the bed 103, with the full width of the loading conveyor running over the bed 103 between the guides 104. The adjustable guides 104 provide for aligning the food product with the mandrel. Pivot plate opening rails 105 are positioned from the start of the loading station support plate 67 to just past the folding shoes 107. These rails open the pivot plates after engaging the pivot plate ears 91. Pivot plate closing rails 106 are positioned down stream of the opening rails 105 and end just after entering the oil pan. The downstream ends of the rails 106 preferably are spring loaded to maintain a gentle pressure against the ears 91 as the mandrel enters the oil. Vee shaped folding shoes 107 are positioned on opposite sides of the longer inner section 73 of the loading conveyor, and pivot arm cam plates 117 and 108 are positioned at the down steam end of the loading station for engaging the mandrel pivot arm 89. A pressure rail 109 in conjunction with a pressure rail 109a in the loading area force the mandrel down onto the tortilla and keep the tortilla sandwiched between the belt 73 and the mandrel. An inner carriage track 110 and an outer carriage track 110' extend around the machine, defining a space therebetween for the rollers 82 of the rods 80, 81 of the mandrel carriages.

Timing fingers 111 are carried on a rod 112 and actuated by a push rod 113 and a crank arm 114 from a timing cam 115. The timing fingers function in the conventional manner for holding up the product 70 and for releasing a product when a mandrel is in position for receiving a product.

In operation, the free end of the mandrel engages the radius turn support plate with the mandrel in the pivot up position and the carriage arm in the up position. The radius turn support plate holds the mandrel and the carriage arm in position during the turn. A carriage arm lifting rail 116 and loading station support plate holds the mandrel and carriage arm in position to the end of the support plate 67 when the mandrel drops onto the tortilla product 70. The mandrel ears 91 engage the rails 105 prior to the mandrel dropping to allow time to stabilize the mandrel position.

On initial engagement of the pivot plate ear with the cam rail, the pivot plate is usually, but not necessarily in the full down position. The cam rails 105 are configured to move upward and outward to move the pivot plates to the position shown in solid lines in FIG. 6. As the mandrel continues to advance, the pivot plate ears pass under the cam rails 106 which swings the pivot plates downward and inwardly to gradually close the pivot plates as shown in phantom lines in 106 to the position shown in FIG. 7.

During this operation, the tortilla product 70 is moved with the mandrel by both sections of the loading conveyor and then by the longer inner section 73 between the folding shoes 107. The leading edges of the opposed folding shoes move under the tortilla product and fold the outer edges upward to the V configuration defined by the mandrel body, as shown in FIG. 6 and FIG. 7. The mandrel with the food product securely positioned therein is now ready for entry into the oil pan.

After picking up the tortilla product and before leaving the longer inner section 73 of the loading conveyor, the pivot arm 89 engages the cam plate 117. As the mandrel passes the bed 103 and loading conveyor section 73, the pivot arm 89 completely rests on the plate 117 which guides the mandrel from the pivot up position to the pivot down position in the oil pan. The engagement of the mandrel pivot arm with the lower cam plate 117 and the upper cam plate 108 insures that the mandrel does move to the pivot down position.

As the carriage with the mandrel enters the oil pan, the main drive chains 57 go slack and the carriages are moved through the oil pan by the carriage pusher chains and pusher members 61, with the mandrels close together as seen in FIG. 1. This arrangement for moving the carriages through the oil pan is now conventional, and is shown in the aforementioned U.S. Pat. Nos. 4,719,849 and 4,754,699.

Figures 4, 5:
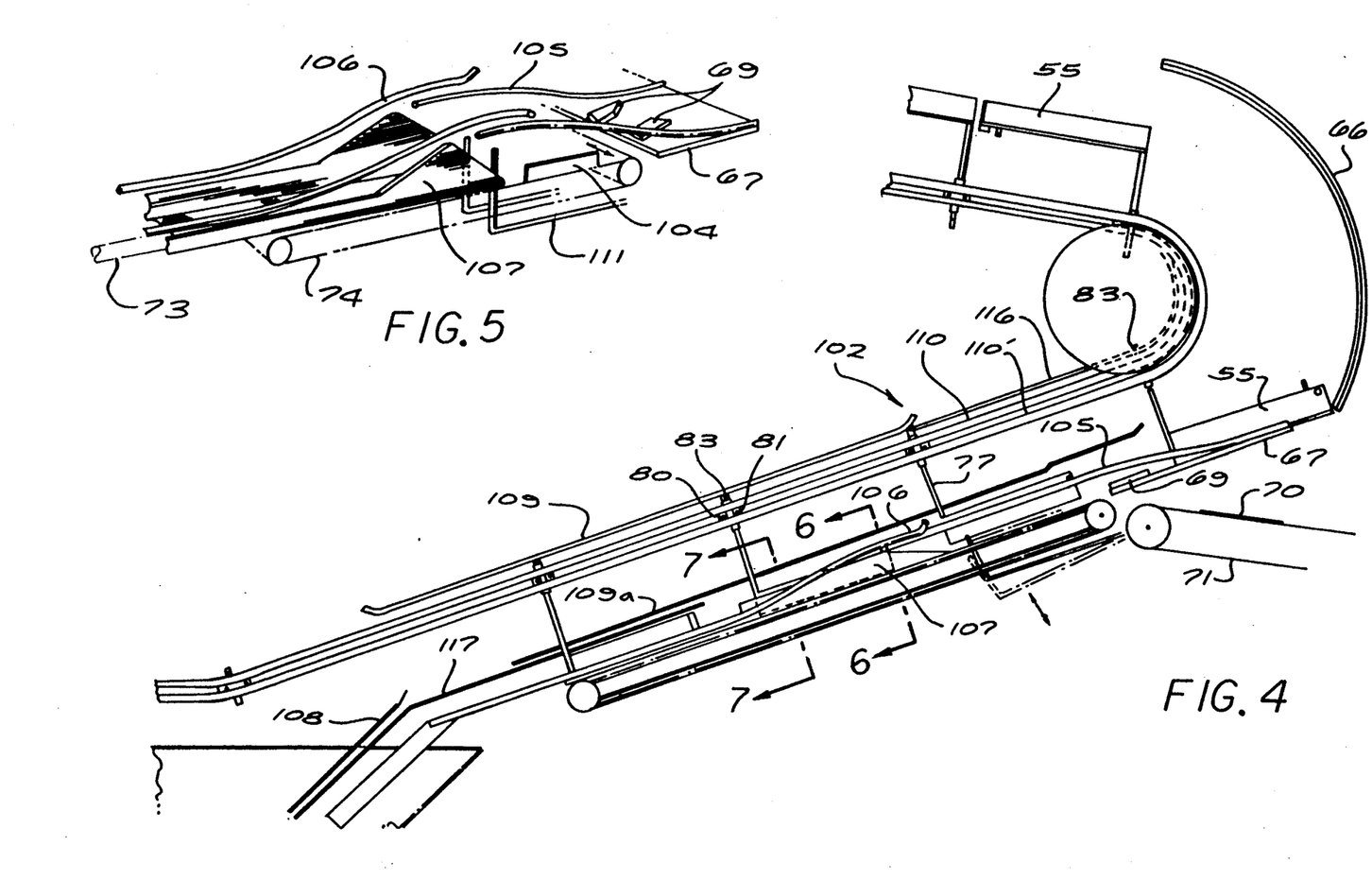
FIG. 4 is enlarged partial side view of the load end of the machine of FIG. 1.
FIG. 5 is an enlarged perspective view of the portion of the indexing and loading apparatus of FIG. 4.

As shown in FIG. 4, the rail 116 in front of the pressure rail 109 maintains the carriage arm in the up position until the mandrel drops. This rail 116 supports the arm 77 and the plate 67 supports the mandrel.

Next consider the discharge end 53, which is best seen in FIGS. 8, 10-13 and 18-21. The discharge end includes a discharge support plate 121, a discharge rail 122, a discharge chute 123, a discharge slide 124, an oil drip pan 125, and a product stripper shown generally at 126. The carriages with mandrels are moved out of the oil pan and up the discharge support plate past the product stripper and along the upper portion of the machine back to the load end by the main drive chains 57, with the pusher members 61 of the carriage pusher chains 59 disengaging from the carriages at the down stream end of the oil pan. The cooked product 51 is carried away from the discharge slide 124 by a discharge conveyor 127.

Figure 8:
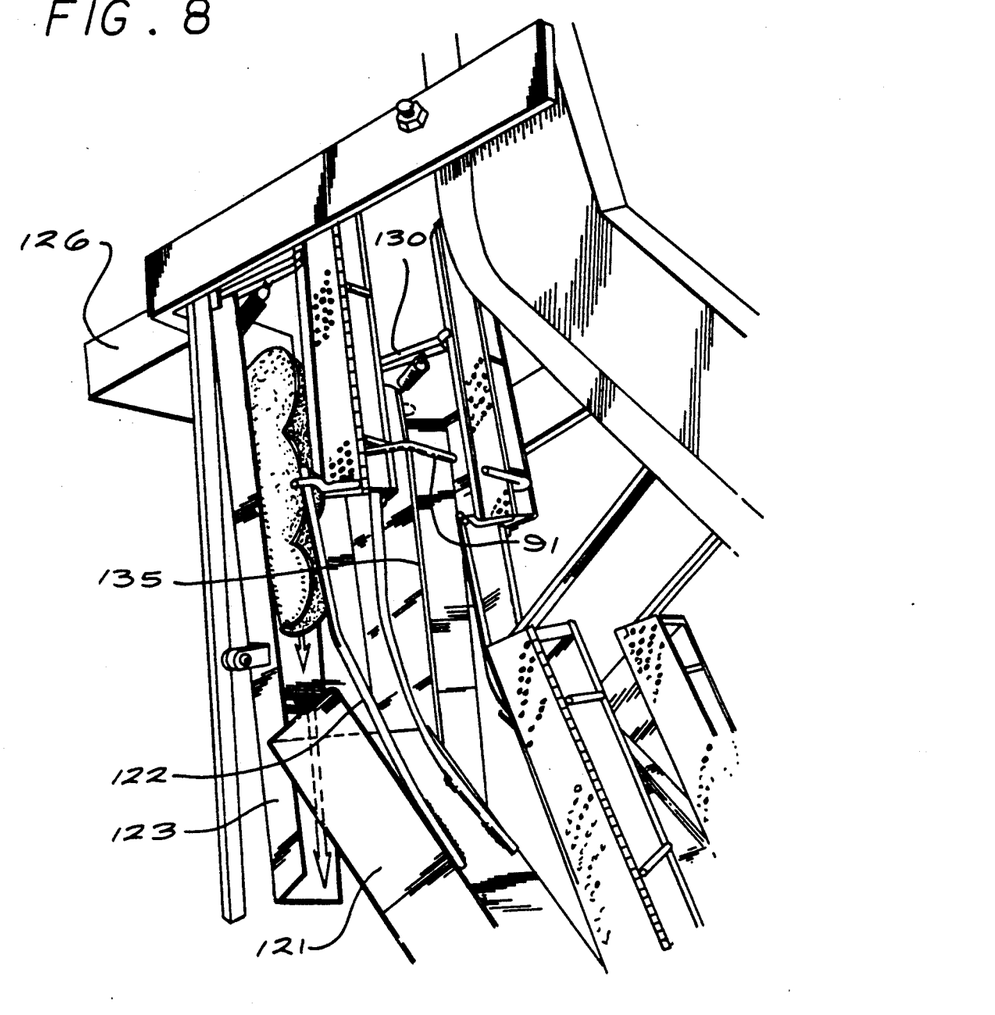
FIG. 8 is an enlarged perspective view of the discharge end of the machine of FIG. 1.
Figure 9:
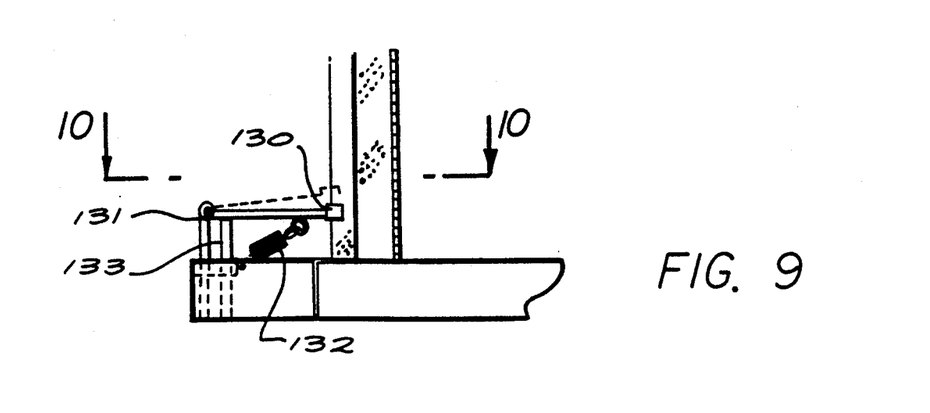
FIG. 9 is an enlarged partial sectional view showing the stripper unit of FIG. 8.
Figure 10:
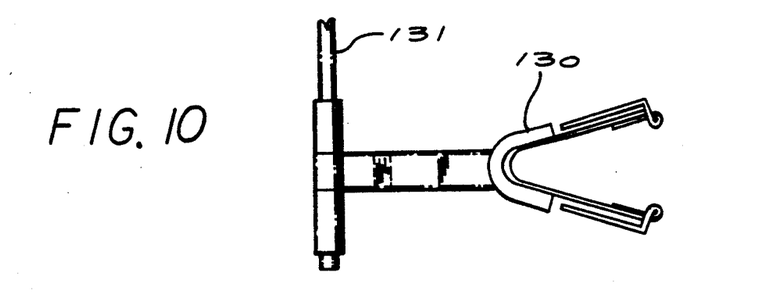
FIG. 10 is a partial sectional view taken along the line 10—10 of FIG. 9.
Figure 11:
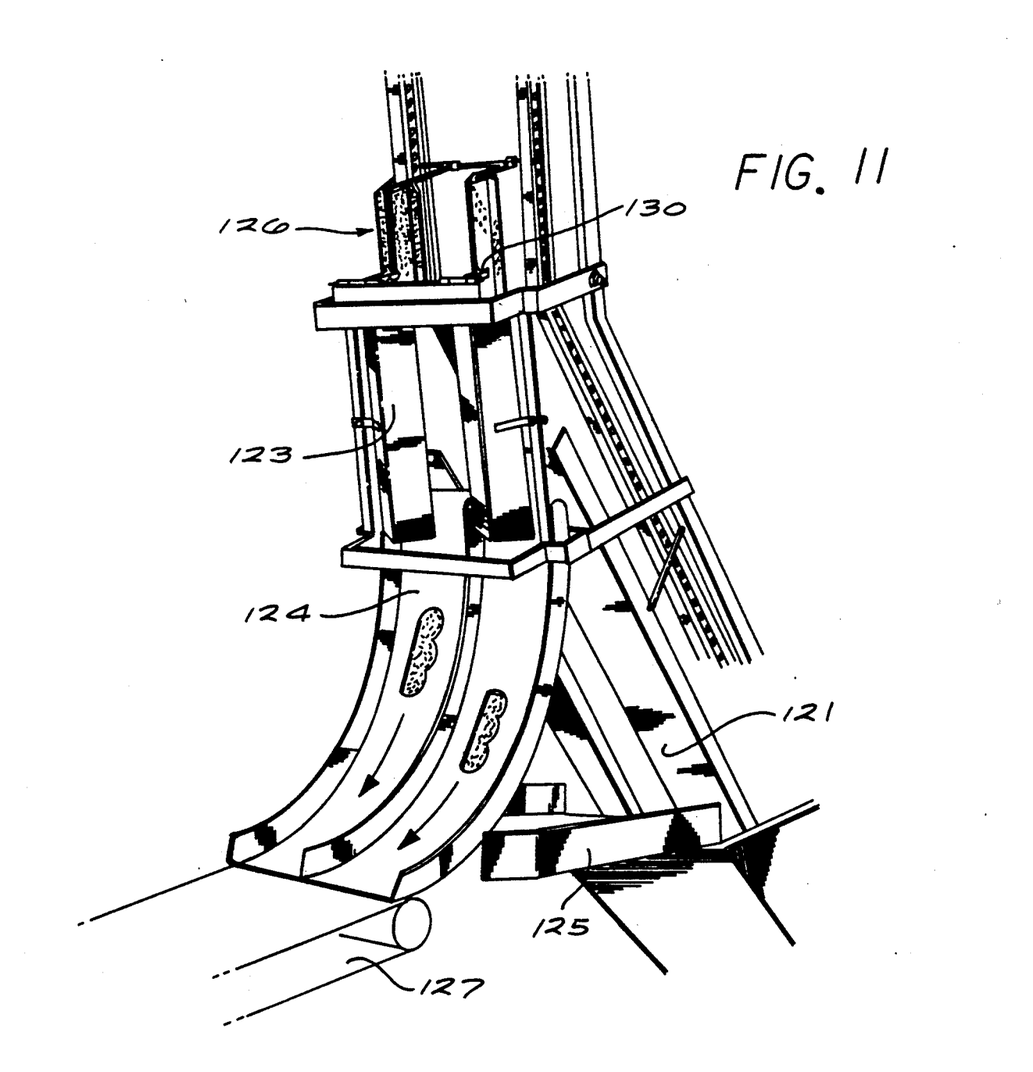
FIG. 11 is another perspective view of the discharge end of the machine of FIG. 1.
Figures 12, 13:
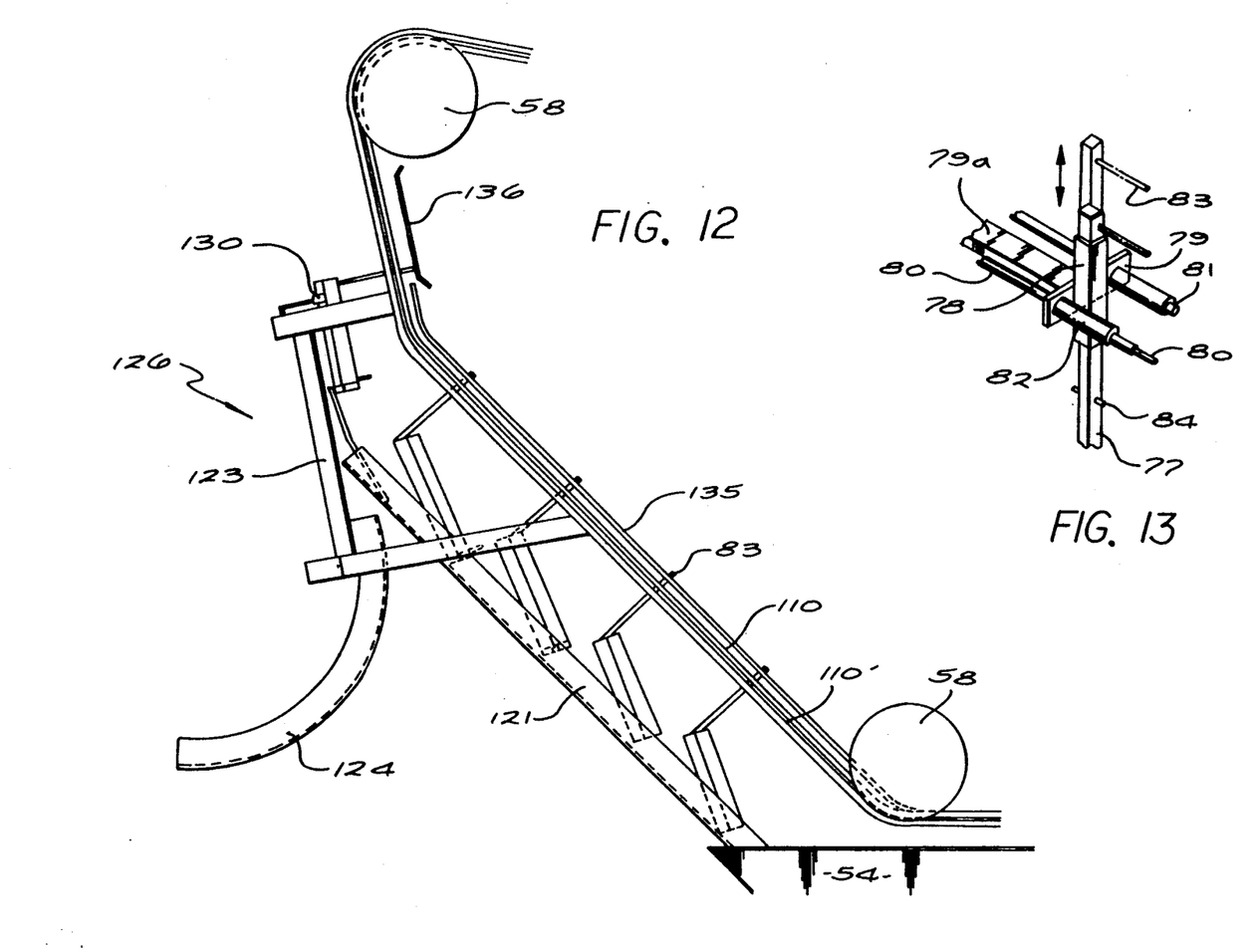
FIG. 12 is an enlarged side view of the discharge end of the machine of FIG. 1.
FIG. 13 is a perspective view illustrating a feature of the carriage of the machine of FIG. 1.

The product stripper 126 includes a stripper unit 130 pivoting on a rod 131, and a spring 132 which urges the stripper unit clockwise as viewed in FIGS. 8, 9 and 12. A stop 133 limits the clockwise movement of the stripper. A rail 135 maintains the carriage arm in the up position as the mandrel is brought into position above the stripper. When the rail 135 ends, the mandrel is forced to drop into the stripper by the pressure rail 136 pushing against arm 83.

In the discharge operation, the mandrel is in the partial pivot up position with the cooked product 51 secured under the pivot plates, with the trailing edge of the mandrel sliding along the discharge support plate 121. As the mandrel approaches the product stripper, the ears of the mandrel engage the discharge cam rails 122. These rails have a widening configuration, as best seen in FIGS. 8 and 19, and function to pop the pivot plates to the open position. The rails are configured to produce the popping action just prior to the mandrel contacting the stripper unit 130.

At this point, the carriage arm 77 drops the nose or the leading edge of the mandrel into the U shaped end of the stripper unit 130. At this time the mandrel is positioned above the discharge chute 123 and as the mandrel continues to move, the food product 51 is brought up against the stripper unit and the food product is stripped from the mandrel, dropping into the discharge chute and sliding down the discharge slide to the discharge conveyor. The mandrel exits the discharge end and returns to the load end. During the movement of the mandrel from the discharge end to the load end, it is supported by the carriage arm in an inverted position, with gravity causing the mandrel to rest against the pivot up hard stop surface of the cam.

We claim:

1. In a food product cooker having a main frame, a cooking oil pan, a plurality of product carriages, and a main drive endless chain for moving said carriages about said main frame to and from said pan, with each of said carriages including a food product holder for holding a food product and a support arm having first and second ends with said drive chain attached at said first end and with said holder attached at said second end, the improvement including loading means defining a loading path and carried on said frame, said loading means including a load support member and a loading conveyor downstream of said load support member, said loading means also including a first lifting rail for lifting said food holder away from said loading conveyor and a first pressure rail for moving said food holder toward said loading conveyor.

2. A food product cooker as defined in claim 1 including a turn support member upstream of said load support member and of a generally arcuate shape, and wherein said main drive chain moves the carriages in an arcuate path adjacent to said turn support member, with said turn support member spaced from said main drive chain a distance less than the overall height of said carriage so that said food holder engages said turn support member in guiding relation.

3. A food product cooker as defined in claim 1 including food product transport means for delivering a food product to be cooked onto said loading conveyor downstream of said load support member, with said loading conveyor moving said food product along a folding station.

4. A food product cooker as defined in claim 3, including first guide means for positioning the food product on said loading conveyor in a predetermined position, and second guide means for positioning said food holder on the food product in a predetermined position.

5. A food product cooker as defined in claim 3 wherein said food holder includes a shaped body with opposing sides, and a wing pivotally mounted to said body at each side, with said wings moveable toward said body to a holding position and movable away from said body to a release position.

6. A food product cooker as defined in claim 5 wherein said folding station includes a food holder open guide and a food holder close guide downstream of said open guide,
with a guide engaging ear carried on each of said wings for engaging said open and close guides in sequence for moving said wings to said release position and then to said holding position.

7. A food product cooker as defined in claim 6 wherein said folding station further includes spaced folding shoes positioned on opposing sides of said loading conveyor,
with said shoes having an upstream end for moving under the food product on said loading conveyor and having upwardly projecting sides for engaging the food product at opposing edges and folding the edges against said shaped body sides,
with said food holder and said loading conveyor moving at substantially the same speed.

8. A food product cooker as defined in claim 7 wherein said food holder includes a pivot arm carried on said holder body and projecting sideways therefrom, and
said frame includes third and fourth guide means for engagement by said pivot arm for pivoting said food holder in said carriage from a position generally perpendicular to said carriage support arm to a position at an oblique angle to said carriage support arm, for forcing said food holder downward into said oil pan.

9. A food product cooker as defined in claim 8 with said food holder body pivotally mounted on said carriage support arm, and including
a stop arm on each of said food holder wings, and
a lock down cam carried on said carriage support arm for engagement with said stop arms, with said lock down cam having a lock slot and,
with said stop arm engaging said lock down cam for locking said wings in said holding position and with said stop arm moving into position at said lock slot when said food holder has pivoted for movement of said wings to said release position.

10. A food product cooker as defined in claim 6 including discharge means defining a discharge path and carried on said frame,
said discharge means including a holder body stripper in said discharge path and a discharge track for guiding cooked food products away from said discharge path.

11. A food product cooker as defined in claim 10 wherein said discharge means further includes a food holder discharge opening guide for engaging said guide engaging ears for moving said food holder wings to said release position as said food holder approaches said stripper.

12. A food product cooker as defined in claim 11 wherein said carriage support arm includes a camming arm at said first end thereof, and
said discharge means further includes first discharge guide means for engagement by said camming arm for holding said carriage and food holder away from said stripper, and second discharge guide means for engagement by said camming arm for moving said carriage and food holder toward said stripper.

13. A food product holder as defined in claim 10, wherein said holder body stripper includes a stripper arm pivotally mounted relative to said frame and including a holder body shaped end for positioning at said holder body, and spring means for urging said stripper arm against a holder body as said holder body moves into engagement with said stripper arm.

14. A food product cooker as defined in claim 13 including a food holder support member upstream of said stripper and spaced from said main drive chain a distance less than the overall height of said carriage, so that said food holder engages said food holder support member in guiding relation as said food holder is moved from said oil pan to said stripper.

15. In a food product cooker having a main frame, a cooking oil pan, a plurality of product carriages, and a main drive endless chain for moving said carriages about said main frame to and from said pan, with each of said carriages including a food product holder for holding a food product and a support arm having first and second ends with said drive chain attached at said first end and with said holder attached at said second end,
the improvement including discharge means defining a discharge path and carried on said frame,
said food holder including a shaped body with opposing sides, and a wing pivotally mounted to said body at each side, with a guide engaging ear carried on each of said holder wings, and with said wings moveable toward said body to a holding position and moveable away from said body position, and
said discharge means including a holder body stripper in said discharge path and a discharge track for guiding cooked food products away from said discharge path and
a food holder discharge opening guide for engaging said guide engaging ears for moving said food holder wings to said release position as said food holder approaches said stripper, and
with said carriage support arm including a camming arm at said first end thereof, and
with said discharge means further including first discharge guide means for engagement by said camming arm for holding said carriage and food holder away from said stripper, and second discharge guide means for engagement by said camming arm for moving said carriage and food holder toward said stripper.

16. In a food product cooker having a main frame, a cooking oil pan, a plurality of product carriages, and a main drive endless chain for moving said carriages about said main frame to and from said pan, with each of said carriages including a food product holder for holding a food product and a support arm having first and second ends with said drive chain attached at said first end and with said holder attached at said second end, the improvement including discharge means defining a discharge path and carried on said frame, said food holder including a shaped body with opposing sides, and a wing pivotally mounted to said body at each side, with said wings moveable toward said body to a holding position and moveable away from said body position, and said discharge means including a holder body stripper in said discharge path and a discharge track for guiding cooked food products away from said discharge path, with said holder body stripper including a stripper arm pivotally mounted relative to said frame and including a holder body shaped end for positioning at said holder body, and spring means for urging said stripper arm against a holder body as said holder body moves into engagement with said stripper arm.

17. A food product cooker as defined in claim 16 including a food holder support member upstream of said stripper and spaced from said main drive chain a distance less than the overall height of said carriage, so that said food holder engages said food holder support member in guiding relation as said food holder is moved from said oil pan to said stripper.

18. A food product holder for a food product carriage for a food product cooker having a main frame, a cooking oil pan, a plurality of product carriages, and a main drive endless chain for moving said carriages about said main frame to and from said pan, with each of said carriages including a food product holder for holding a food product and a support arm having first and second ends with said drive chain attached at said first end and with said holder attached at said second end, the improvement wherein said food holder includes a shaped body with opposing sides, a wing pivotally mounted to said body at each side, with said wings moveable toward said body to a holding position and moveable away from said body to a release position, and a guide engaging ear carried on each of said wings for engaging open and close guides of said frame in sequence for moving said wings to said release position and then to said holding position, with a pivot arm carried on said holder body and projecting sideways therefrom for engaging guide means of said frame for pivoting said food holder in said carriage from a position generally perpendicular to said carriage support arm to a position at an oblique angle to said carriage support arm, for forcing said food holder downward into said oil pan.

19. A food product holder as defined in claim 18 with said food holder body pivotally mounted on said carriage support arm, and including a stop arm on each of said food holder wings, and a lock down cam carried on said carriage support arm for engagement with said stop arms, with said lock down cam having a lock slot, and with said stop arm engaging said lock down cam for locking said wings in said holding position and with said stop arm moving into position at said lock slot when said food holder has pivoted for movement of said wings to said release position.

* * * * *